United States Patent
Dietzel et al.

(10) Patent No.: US 6,665,258 B1
(45) Date of Patent: Dec. 16, 2003

(54) METHOD AND APPARATUS FOR RECORDING, STORING AND REPRODUCING INFORMATION

(75) Inventors: Andreas Dietzel, Wallertheim (DE); Friedrich Fleischmann, Erlangen (DE)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 09/609,458

(22) Filed: Jul. 3, 2000

(30) Foreign Application Priority Data

Jul. 3, 1999 (EP) ............................................. 99112900

(51) Int. Cl.[7] ................................................ G11B 7/00
(52) U.S. Cl. ................................................... 369/126
(58) Field of Search ............................... 369/126, 47.4, 369/47.41, 47.49, 47.5, 47.51, 94

(56) References Cited

U.S. PATENT DOCUMENTS

| | | | | |
|---|---|---|---|---|
| 4,916,688 A | * | 4/1990 | Foster et al. | 369/126 |
| 6,001,519 A | * | 12/1999 | Yang et al. | 369/126 |
| 6,084,849 A | * | 7/2000 | Durig et al. | 369/126 |
| 6,101,164 A | * | 8/2000 | Kado et al. | 369/126 |
| 6,147,959 A | * | 11/2000 | Ohyama | 369/126 |
| 6,477,132 B1 | * | 11/2002 | Azuma et al. | 369/126 |

* cited by examiner

Primary Examiner—Thang V. Tran
Assistant Examiner—Bach Vuong
(74) Attorney, Agent, or Firm—Robert B. Martin; Bracewell & Patterson, L.L.P.

(57) ABSTRACT

A method and apparatus for recording and storing information on and reproducing information from a storage medium is described, wherein the active storage medium forms part of the write/read signal path.

19 Claims, 6 Drawing Sheets

METHOD AND APPARATUS FOR RECORDING, STORING AND REPRODUCING INFORMATION

BACKGROUND OF THE INVENTION

1. Technical Field

The present invention generally relates to a method for recording, storing, and reproducing information. More specifically, the invention relates to such a method using an apparatus for detecting information in accordance with an interaction between a probe and a sample. Still more specifically, the present invention relates to a medium to be used for recording, storing and reproducing information.

2. Description of the Related Art

There is currently much interest in the potential applications of scanning probe microscopy (SPM) technology. SPM has been used for fundamental studies of local frictional properties such as the boundary lubrication of molecular thin films between a recording head and the respective thin film recording media in magnetic recording. SPM storage techniques use scanning probe methods for recording, storing and reproducing information. Examples include Scanning tunneling microscopy (STM) and Atomic Force Microscopy (AFM). Utilizing such techniques, modifications of a storage medium, such as changing surface topography or modifying physical characteristics, can be induced and detected by measurement of physical quantities, e.g. measuring the force between a probe tip and the medium.

As IT equipment becomes smaller due to continuing improvements in microelectronic development, conventional data storage utilizing rigid disk drives becomes a limiting factor in efforts to reduce the size of such equipment. Conventional storage devices are limited by the incorporation of moving parts which reduces reliability and ruggedness.

Semiconductor memories, on the other hand, are limited in terms of both size and cost. There is a growing requirement for high-capacity storage devices having a significantly reduced size, especially in multimedia applications which rely on very high data rate and low access times.

Data storage using scanning probe techniques have the potential for high storage density (cf. H. J. Mamin et al., "Tip-based data storage using micromechanical cantilevers", Sens. actuators A, vol. 48, pp. 215–219, 1994) and approaches to parallelize storage devices are promising high data rates (cf. U.S. Pat. No. 5,835,477 to G. Binnig et al.). Highly parallelized devices are particularly reliant on a high degree of integration and lowest possible crosstalk between individual channels.

Scanning probe techniques (SPT) are well known techniques for detecting physical quantities on a nanometer scale. Physical quantities are detected by observing the interaction between a sharp tip probe and a sample. Examples of quantities detected in this manner include tunneling current, atomic force, magnetic force, electrostatic force, light density. These techniques resolve a spatial resolution from about 1 nm to about 100 nm. Due to this enormous spatial resolution, several approaches for using such techniques for digital data storage have been made.

Bits ranging in size from 1 nm to 100 nm were already written by such techniques as tunneling current, surface deformation of the medium by heating the tip (cf. G. Binnig et al., "Thermomechanical writing with an atomic force microscope tip", Appl. Phys. Lett., vol 61, pp. 1003–1005, 1992, and H. J. Mamin: "Thermal writing using a heated atomic force microscope tip", Appl. Phys. Lett., vol 69 pp. 433–435, 1996), and E-field induced charge deposition (cf. I. Fujiwara et al., "High density charge storage memory with scanning probe microscopy", Jap. J. Appl. Phys. vol. 35, pp. 2764–2789, 1996; and B. Terris et al., "Localized charge force microscopy", J. Vac. Sci. technol A, Vol. 8 No.1, pp. 374–377, January/February 1990). The information stored was read back by appropriate SPT.

Utilization of field-induced reversible switching processes in some specific organometallic materials is described by Yamaguchi (S. Yamaguchi et al., "Surface Modifications on Charge-Transfer Complexes using Scanning Probe Microscopy", Mat. Res. Soc. Symp. Proc vol 3, 1993). Yamaguchi describes a switching phenomenon in which the resistivity of a material switches from high resistivity to low resistivity if the electric field beneath a probe exceeds a material specific threshold. Resistivity can be switched back by applying a field of negative polarity. A similar effect is identified for optically induced switching. A kind of readback was performed by optical inspection of the material surface.

U.S. Pat. No. 5,535,185 describes an apparatus implementing SPT for recording/reproduction of information using physical quantities like tunneling current, electric field radiation current, contact current, electrostatic capacitance, atomic force, magnetic force, and electrostatic force with adaptive recording/erasing conditions. A single probe system with additional control circuits is demonstrated.

Another approach is proposed in U.S. Pat. No. 5,835,477 which uses a highly parallel array of probes on a storage medium. Recording/reproduction follows the above-described principles.

All of the above mentioned SPT approaches are characterized by the use of a write stimulus on a probe, causing a modification of the storage medium. Examples of such modifications are electric, magnetic, optical and elastic characteristics as well as surface topography or thickness. Stored information is read back by measurement of the modified physical quantity, detected by the probe (e.g. resonance frequency of cantilever, bending stress of cantilever, resistance change due to cooling effects).

All of these methods incorporate the following scheme. First, information is written to a medium via a transducer. The information is then stored by physical modifications of the storage medium. Thus, the storage medium itself is passive, being an object of modification. Recording and reproduction is solely performed by detecting changes in the probe response. Information read back is performed by again detecting modifications of the storage medium via a transducer (writing device/reading device). In the interest of medium reusability, means to erase the medium are usually provided.

Since all recording and reproduction is done via a probe, the probe must be highly complex. It must carry write and read stimuli as well as a readback signal. To operate such a probe, a very complex electric system is required to be located on a limited space. In particular, array-like structures, as proposed by G. Binnig et al. (U.S. Pat. No. 5,835,477), rely on a highly dense design while maintaining minimum interference between probe elements. Such dense configurations regularly suffer from crosstalk, noise, mechanical instability and fabrication problems.

Furthermore, use of probe transducers for recording and reproduction excludes several physical characteristics (e.g. like optical transmission effects) from use in storage applications. Due to its limited impact on functionality, optimization of the passive medium results in small performance improvements.

SUMMARY OF THE INVENTION

It is therefore an object of the invention to provide a method and apparatus which improves scanning probe storage systems.

It is another object of the invention to provide a method and apparatus capable to add an active functionality to the storage medium.

The present invention features an active storage medium. This storage medium plays an active part in recording, erasure and reproduction either in part or in a combination of these processes. This active feature is characterized by a signal path crossing the medium during the corresponding process(es). The active role may be one or all, but is not limited to one of the following:

writing via medium;

readback via medium;

erasure via medium; and heating via medium.

Several physical characteristics may be used for this. Examples for such quantities are electrical conductivity, optical characteristics, e.g. transparency/reflectivity, or electrical capacity. This list is given for example only and not limiting. The medium may be patterned, especially advantageous on a storage-field scale.

DETAILED DESCRIPTION OF THE PREFERRED EMBODIMENT

Figure 1:
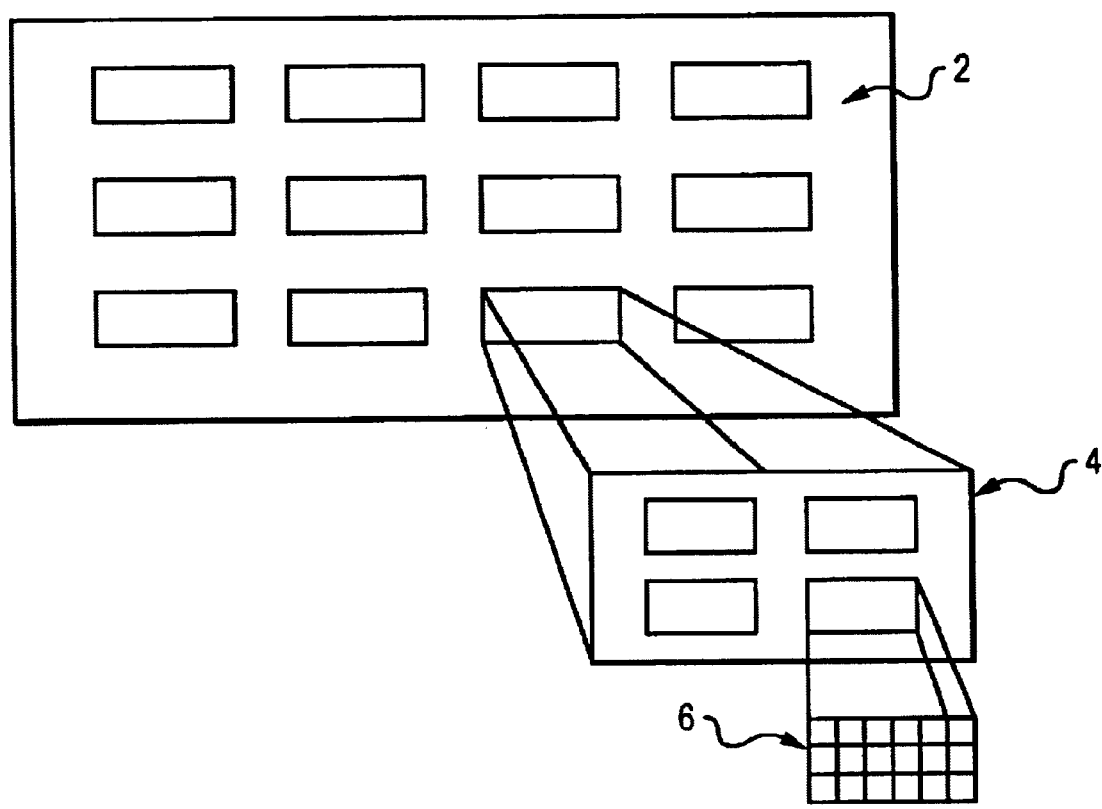
FIG. 1 is a top view of a structured medium depicting a storage fields principle.

A major part of digital online storage systems use hard disk drive systems. Currently, such systems have an areal density of 4 Gb/in2, increasing with a growth rate of about 60%/year. However, there is an upper bound since with ever shrinking bit size the information written becomes unstable. Thus, other techniques are required to overcome this limitation.

Scanning Probe Techniques (SPT) have shown considerable promises for storage applications due to the high density achievable. Scanning probe microscopes like scanning tunneling microscope (STM) or atomic force microscope (AFM) have been used to locally change storage media characteristics on a nanometer scale. While modifications on atomic level was already demonstrated (S. Hosaka et al., Appl. Surf. Sci., vol. 60/61, p. 643, 1992) using STM, such systems suffer from sensitive and slow tip-medium-distance servo control (required to maintain a sub-nanometer tunneling gap) and weak data rates. Other approaches like charge storage memory (I. Fujiwara, "High density charge storage memory with scanning probe microscopy", Jap. J. Appl. Phys. vol. 35, pp. 2764–2789, 1996) were used to show densities of up to 63 Gb/in$^2$. Intendation techniques causing local surface modifications and read back by a cantilever with tip (eliminating the slow tip-medium-distance servo) were examined by several researchers (e. G. B. Chui et al., "Low-stiffness silicon cantilevers with integrated heaters and piezoresistive sensors for high density AFM thermomechanical data storage", J. Micromechanical systems, vol. 7, no.1, 1998; H. J. Mamin et al. "High density data storage using proximal probe techniques", IBM J. Res. Develop., vol. 39, pp. 681–699, 1995).

While attention has been given to highest data density, aspects like reliability, data rate, and access time have been of minor interest. However, these aspects are as important for commercial use of storage systems as is density. For most promising AFM based storage applications, arrays of hundreds of probe elements are proposed to achieve data rates comparable to conventional hard disk drives (M. Lutwyche et al., Microfabrication and parallel operation of 5×5 2D AFM cantilever arrays for data storage and imaging", Proceedings MEMS 98, pp. 8–11, 1998, IEEE Catalog Number 98CH36176; U.S. Pat. No. 5,835,477).

For a common understanding of basic terms according to SPT based storage in the following description a short description is provided hereinbelow.

Cantilevers

Cantilevers mentioned in accordance with this invention are such cantilevers intended for use in Scanning Probe Technology (SPT). These cantilevers are micromechanical structures, manufactured by semiconductor and micromechanical processes. To adapt cantilevers to special requirements of the intended applications, parameters like geometry, material composition and substrate must be taken into account. Examples for these are stiffness or resonance frequency. Fabrication of such cantilevers is standard. Also, such cantilevers can be fabricated as cantilever arrays.

Tip/probe Tip

The tip on the cantilever works as a local probe. It can be used for write as well as for read processes. Its sharpness determines the data density achievable. Tips are usually fabricated during cantilever fabrication by etching. Tips may be made for instance from doped or undoped silicon or tungsten and can be modified (e.g. laminated, doped) to add special functionality (e.g. conductivity).

Probe Transducer

The term "probe transducer" used herein refers to a small scale transducer, usually based on a cantilever/tip-combination with additional means to generate write and read signals. It is used for local modification of the storage medium and for detecting the different physical characteristics of the medium, which represent the stored information.

Storage Medium

Information is stored or erased by causing or removing local physical modifications of the storage medium. Examples for such local modifications include the following:

changes in topography;

changes in composition;

creating or altering chemical bonds;

creating or altering domain structures;

altering crystalline phase;

creating, altering or destructing electronic states; and creating or altering polarization states.

Any combination of physical or chemical effects can be used. A (incomplete) description of media for storage use can be found in U.S. Pat. No. 5,307,311. The storage medium may be composed of one or more layers on a substrate or without substrate. It may also be structured to provide separate storage fields, covering individual bit cells or arrays of such bit cells. The concept of storage fields is given in U.S. Pat. No. 5,835,477. The general structure is depicted in FIG. 1. A medium 2 is separated in several storage fields 4, which again may be separated in smaller storage fields 6. The concept of storage fields is especially advantageous in combination with probe arrays. Subarrays of probes or individual cantilevers may have their own storage field assigned. This accomplishes an efficient use of storage media area and erasure/refresh on storage field level.

A commonly used storage medium for AFM based storage are polymers like PMMA. Topography changes in such a medium can easily be performed by locally heating up and melting or by softening and denting in with a probe tip. Other effects to be used are charge deposition.

With ever shrinking physical dimensions and increasing data rates, highly parallel systems become subject of interest. Such systems rely on a clear separation of read signals from individual channels to maintain data integrity, and of course on a small outline.

In the following description the present invention is described in more detail with reference to the associated drawings.

Figure 2:
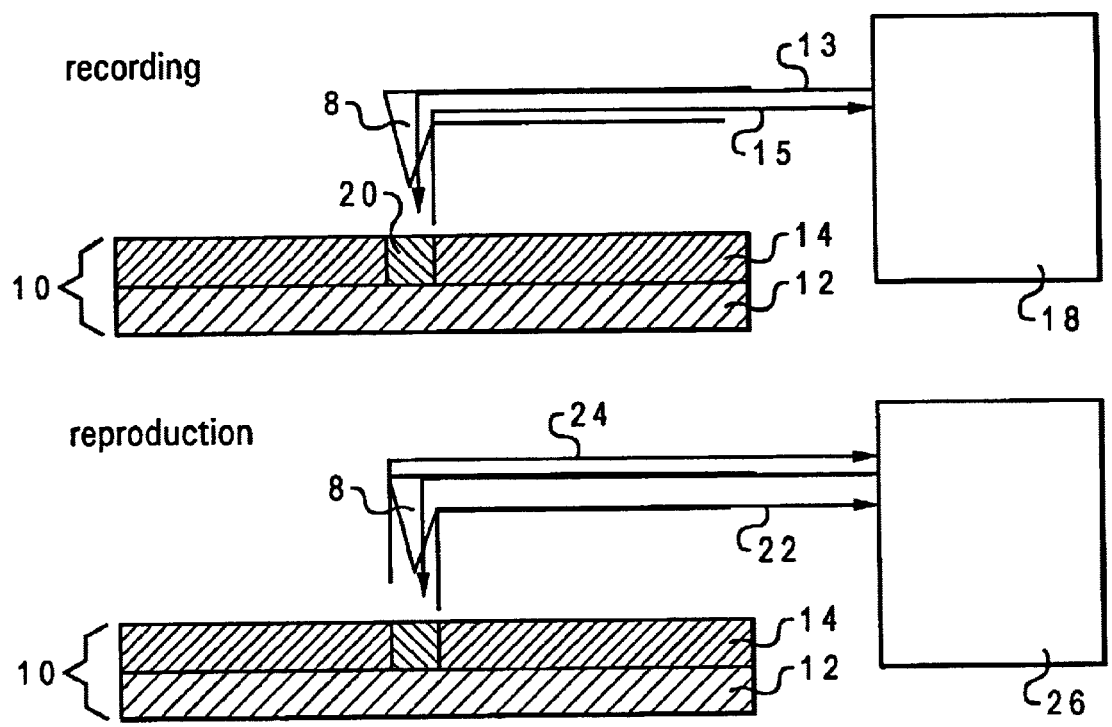
FIG. 2 illustrates conventional recording and reproduction.

Conventional approaches use configurations like those depicted in FIG. 2. Information is stored by local modifications of the storage medium as already described. Local modifications of a size down to a few nm were already reported in the art.

A probe transducer 8 scans over a storage medium 10, composed of a substrate 12 and one or several layers forming the recording medium 14. The medium may be separated in storage fields. Probe transducer 8 can be constructed as a single probe as well as a probe array, composed from a one or two-dimensional combination of cantilevers and tips. The depicted cantilevers are moved either in contact with the medium surface or slightly above them.

When scanning the storage field or medium, the tip(s) is(are) used to perform local modifications of storage medium 10 to measure the appropriate physical quantity and detect the written information accordingly. The positioning of the probe (array) may be controlled by an appropriate feedback mechanism. Usually, a computer program functions as the origin of data, forming a stream of digital data. A write driver circuitry converts the digital data stream into an appropriate write signal, which can be used to form the relevant modifications of the medium. This write signal 13 arises from a data source 18, feeds into the tip and, in turn, closes via write signal return path 15 at the data source 18. Any such configuration supplying a sequence of write data is denoted as data source. The local modification is depicted by information bit 20.

For readback, a read stimulus 22 is generated and fed to the probe transducer. This stimulus is modified by the information stored, forming the the read signal 24. Read signal 24 is then fed back to a detection circuitry, converting it to a digital data stream usually used by a computer program. Such combinations of stimulus generator, detection and data using means are referred to as data sink 26.

Conventional Recording

When recording information, data usually is written to a medium via a probe-like transducer. Information is thus stored by physical modifications of the storage medium. The conventional approach (FIG. 2) applies a write signal originating from a data source to the probe. A write circuitry to supply such signals is integrated into the data source. This write signal changes the behavioral characteristics of the probe tip (e.g. heating up the tip for thermomechanical storage), thus modifying the medium (in the example given by surface modification due to locally melting a polymer). The local modification of media characteristics is representing by an information bit. Thus, at least two leads to the tip are required for thermomechanical storage. Write signal path starts at the data source and closes via the probe transducer at the data source.

Conventional Readback

For readback, a read stimulus signal is applied to the probe transducer. The nature of the read stimulus depends on the physical characteristic changed to form the information bit and the detection method. Read stimulus can be supplied either directly by the data sink or by an additional circuitry (not shown in FIG. 2). An example for read stimulus is sense current used in AFM based storage with piezoresistive probe sensors. An example of this is given by thermomechanical storage. Bending of the cantilever, caused by the surface topography of the medium, change the resistance of the transducer and thus the read signal which in this case is the voltage drop of the read stimulus current on piezoresistor elements. Leads to carry stimulus must be supplied as well as piezoresistive elements integrated into the probe.

The read stimulus is modified by the stored information due to the changed physical characteristics of the medium. The modifications represent the read signal. Usually, the combination of read stimulus and modifications is called read signal. The read signal is fed back to the data sink. In the data sink the modifications of read stimulus are detected and converted to binary representation.

Figure 3:
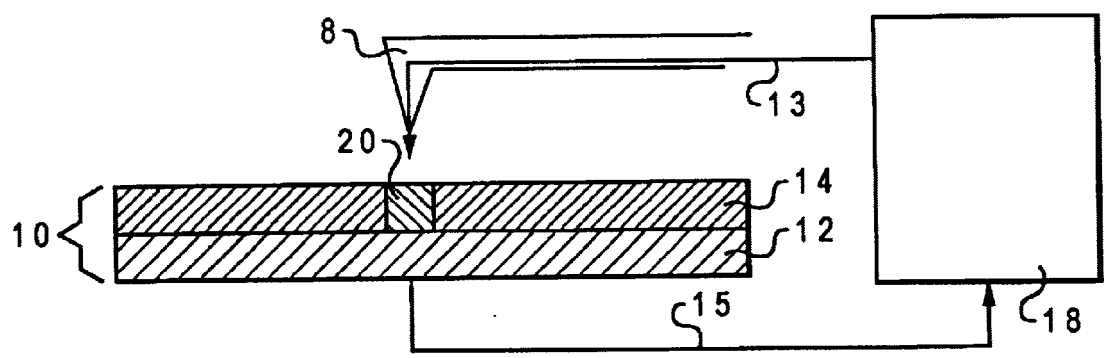
FIG. 3 depicts the principle of recording with an apparatus in accordance with the present invention.

The recording approach of the present invention and depicted in FIG. 3 includes active functionality of the storage medium during the recording process and further provides a data source 18, and generating a write signal 13 which is emerging out of the data source 18. Write signal 13 crosses recording layer 14 and the signal path closes via write signal return path 15 at the data source.

As an example, a DC write current originates from the data source. Current flows from source to tip, locally crossing the medium, and, via a conductive layer or substrate, returns to the data source. This current changes the medium's local characteristic (e.g. by burning holes in a light absorbing layer or a high resistive layer).

Figure 4:
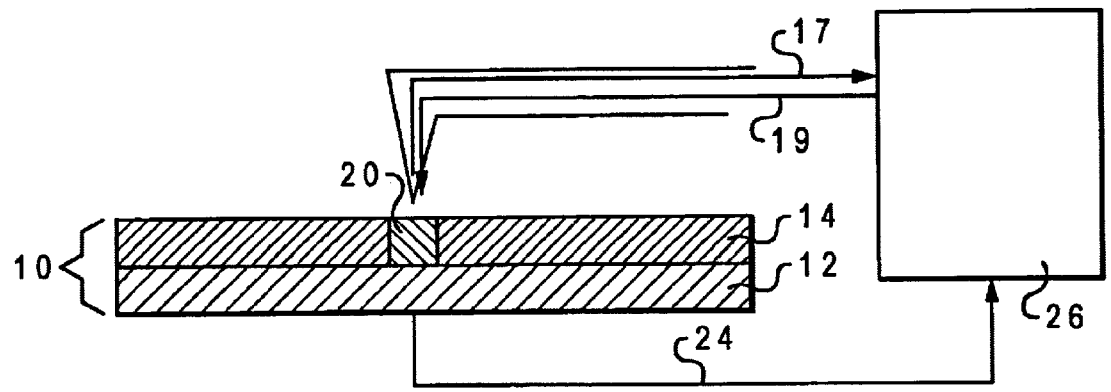
FIG. 4 illustrates the principle of reproduction with an apparatus in accordance with the present invention.

Referring now to FIG. 4, the principle of reproduction with an apparatus in accordance with the present invention is depicted. Read stimulus 17 emerges from a data sink 26. Read stimulus 17 may or may not close via return path 19. Read stimulus 17 is either modified by written information bit 20, thus forming the read signal 24 (modifications of the stimulus represent the information), or it generates a new signal (also depicted as read signal 24). In either case, the signal path is crossing the recording medium 14 and read signal 24 is received via the medium sense layer or substrate, closing the signal path at data sink 26.

An example may be an insulating layer on a conductive substrate. Information is represented by holes in the insulating layer. During readback, a probe is in contact with the insulation layer. A well-controlled voltage (supplied by the data sink) between probe and substrate may work as a read stimulus. If the probe reaches a hole, a current will flow from data sink via probe and medium back to the data sink. This current represents the read signal and thus the written information. The read signal path starts with the read stimulus at the data sink and closes via the probe transducer and the medium.

Examples and more detailed descriptions are given in the explanation of FIG. 5 to FIG. 11.

The advantages of the proposed method are:

(1) Easier fabrication of probe transducers due to reduced complexity: Integrating all functionality into the probe requires a high amount of signal generating and amplifying elements additional to the elements building the core of the probe. This means, devices to generate write signals, wiring for write signals, read stimulus and read signals are required. Means to convert written data to read signals by detecting the applied changes in physical characteristics of the medium are also required. All this must be integrated on miniaturized scale of the probe-like transducer. In contrast to this conventional approach, the proposed method requires less elements on the probe (amount and kind depending on the functionality transferred to the medium). Since now some signals are carried on the medium-side of the storage system, less wiring is required. This leads to more free space for integrating the required elements and easier manufacturing processes.

(2) Reduced cross dependencies between write and read signal: Due to reduced amount of wiring on side of the probe, a better separation (distance between each other, optimized layout) between signal leads can be achieved. Also the separation in probe-sided and medium sided wiring reduces in some configurations interactions between the write process and read process.

(3) Fabrication processes for medium and transducer are separately optimizable: Currently, elements required for recording and reproduction must be integrated on the probe-like transducer. All manufacturing processes must be compatible. This limits the range of usable processes and materials for realization of specific write or read elements. Separating for instance incompatible elements by moving its functionality to the medium, optimized process and material can be used for the probe-like transducer as well as for the medium. Since the new approach promises a win in usable area on the side of the probe, more complex structures can be realized. This could be used for further improvements of the recording/reproduction process.

(4) Higher readback signals by use of currently unusual physical quantities.

(5) Accurate erasure of individual storage elements and/or bits by direct addressing.

Especially approaches using arrays of cantilevers suffer from space limitations and crosstalk due to the great amount of connections to address the probe and to supply stimuli and signals. With the invention proposed here, a significant reduction in connections and thus a better separation of signals is achieved.

EXAMPLES

In the following, some examples using special effects are given.

Figure 5:
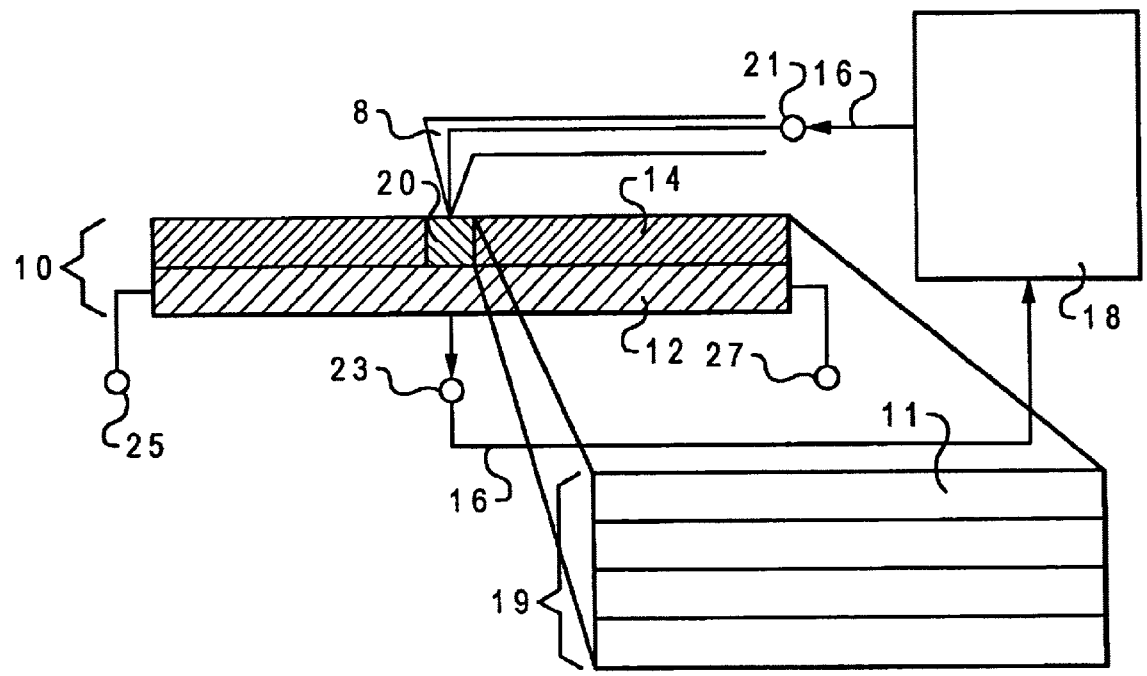
FIG. 5 depicts an example of the method for recording and erasure in accordance with the present invention, using the effect of electrical conductivity.

One example using the physical effect of electrical conductivity is shown in FIG. 5. The function is as follows:

The storage medium is formed by a highly resistive recording layer 11 which has been applied to a conductive substrate 12. Alternatively, this layer 11 may be formed as a part of a multilayer composition 19 including said highly conductive layer. This will eliminate the need for a conductive substrate. This arrangement can be applied, e.g., to a chip. For recording, a (writing) current $I_w$ 16 flows between the connections 21, 23 of the probe transducer 8 and the medium. The write current starts at the write driver (part of data source 18), enters the recording layer starting from the cantilever tip, thereby changing the storage material, e.g., by building holes or locally switching to a high conductive state, and ends at write driver. The tip of the probe transducer will be doped or laminated to high conductivity state. Capacity can be used instead of resistance as well.

Figure 8:
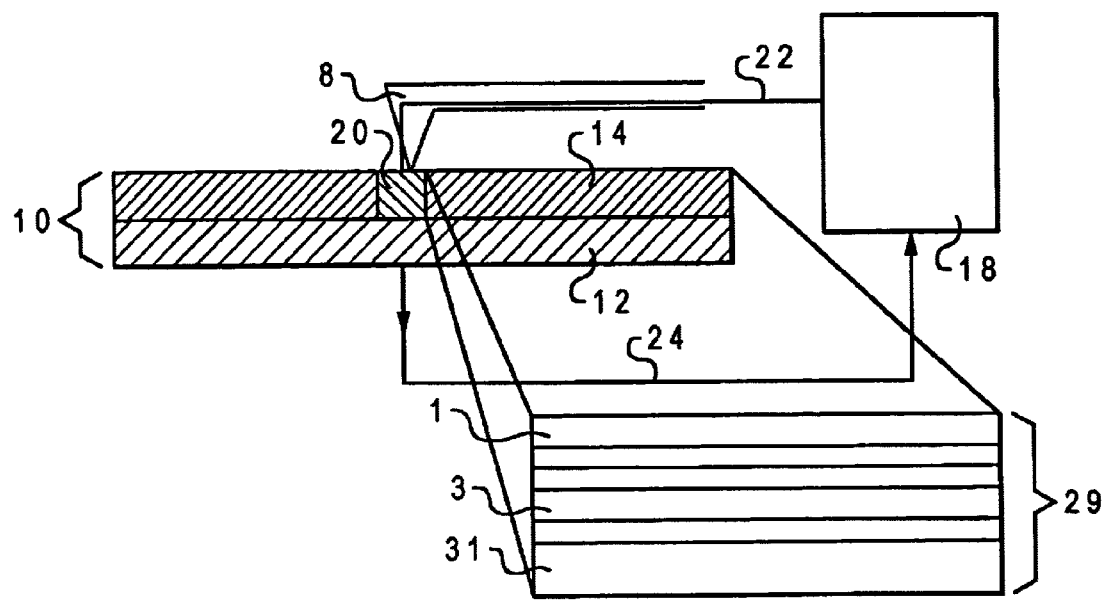
FIG. 8 illustrates another example of the method in accordance with the present invention, using optical effects for recording.
Figure 9:
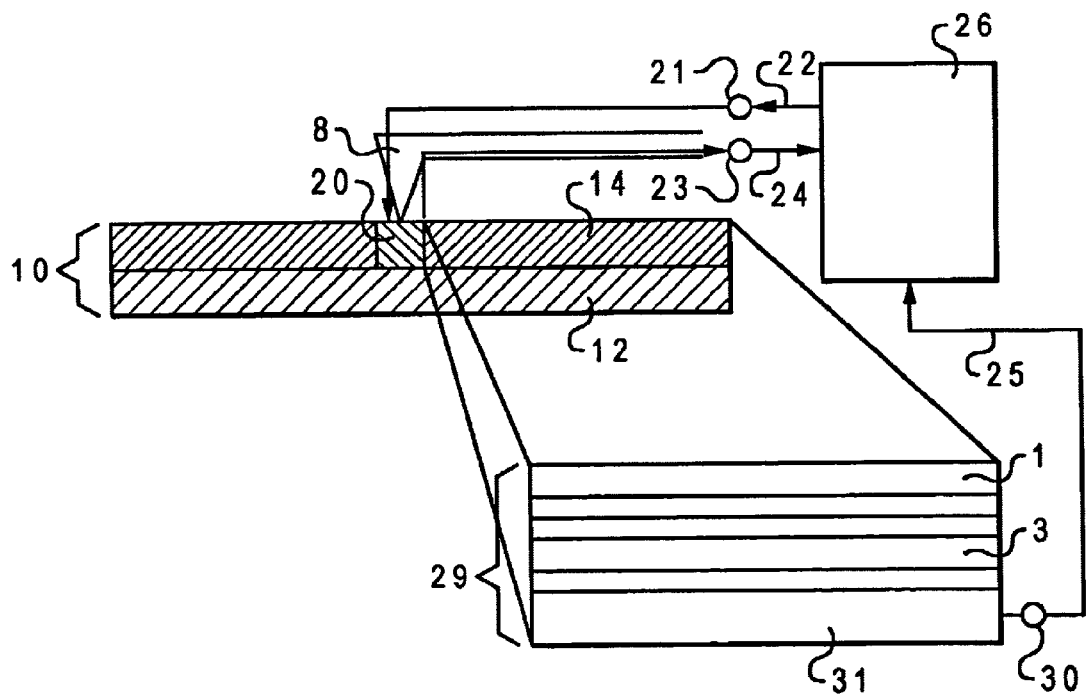
FIG. 9 depicts an example of the method in accordance with the present invention, using optical effects for reproduction.

For erasure, for instance a whole storage field may be erased by applying an erasing current to erase contacts 25, 27. This erasing current will heat up the high resistive recording layer either directly or via the substrate or a special heating layer 3 (as shown in FIG. 8). The softened material will close the holes burned in.

In an especially advantageous embodiment, a storage (electrode)-field is performed identical to the scanning area. That way the complete storage scanning area can be erased as a whole.

Figure 6:
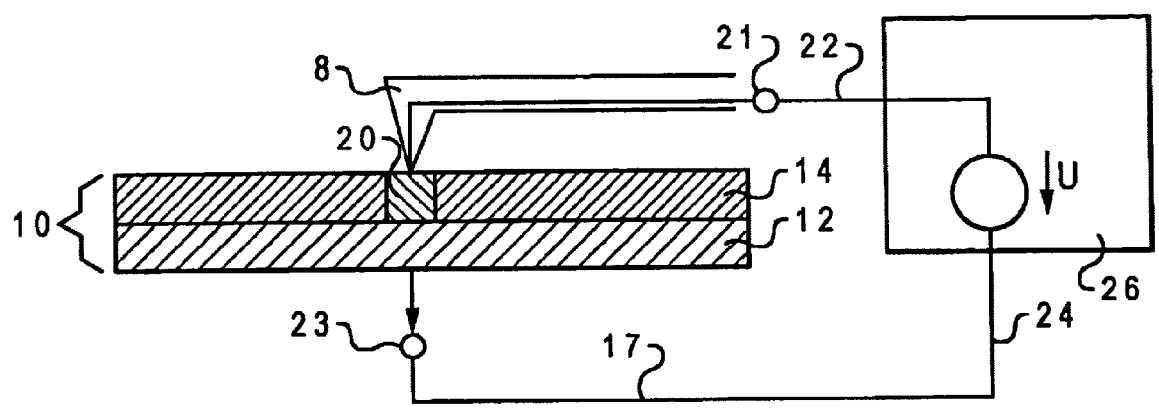
FIG. 6 illustrates an example of the method for reproduction in accordance with the present invention, using the effect of electrical conductivity.

During read process the decreased resistance between the cantilever and the conductive substrate at the information bit 20 is detected by measurement of the current between tip and medium. An example is depicted in FIG. 6. A read stimulus 22 is fed to the connections 21, 23 of the probe transducer and the medium. This stimulus may be formed by a high precision voltage source. As long as the tip of the probe transducer 8 is in contact with the high resistive part of the recording layer 14, no or low current will flow between tip and medium 10, as well as between contacts 21, 23. Reaching a modified information bit with low resistivity, a higher current will flow forming a read signal 24. High/low current states of read signal represent the information stored, which is detected within data sink 26. The advantage of such embodiment are the relative high currents that can be achieved. Currents are limited only by temperature limits of the tip and the medium. High currents maintain a good signal-noise-ratio forming a robust system.

Figure 7:
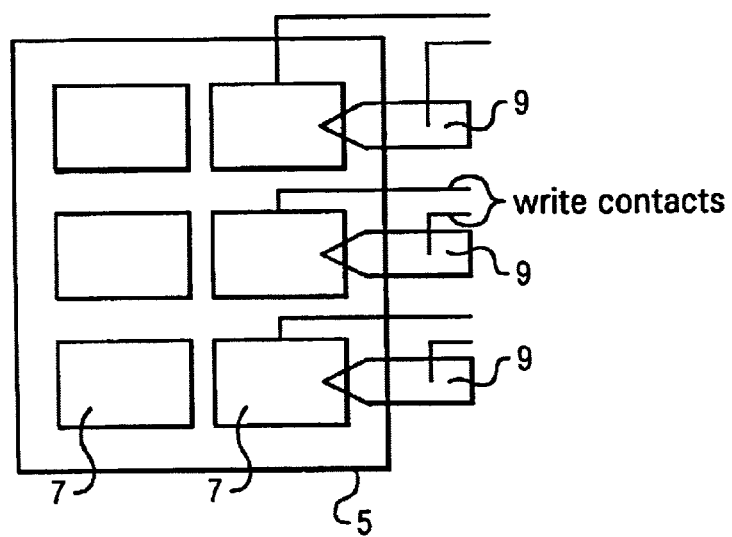
FIG. 7 depicts a top view of storage field separated medium with erase contacts and probe transducers.

It is an advantage of such an embodiment that only one lead to the cantilever is required. FIG. 7 shows a top view of a transducer array 9 on a medium 5 separated into several storage fields 7. Only two leads per storage field 7 and individual probe transducer 8 are required.

Conventional approaches require two or more leads to carry write signals, read stimulus and read signal. Often, additional elements like for instance piezoresistors are needed. Leads and elements occupy precious area on the small probe, interact with each other disturbing write and read signals, and limit reliability.

An other example, shown in FIG. 8, uses optical effects:

Instead of the resistive layer a layer comprised of optical adsorbing or high reflectivity material 1 is applied above a CCD sensor 31. It may be embedded in a multilayer structure 29. This material is locally perforated by the writing current using methods already described. For erasing, an additional heating layer 3 may be applied between the adsorbing/reflecting layer and the CCD-sensor, whereby the recording area is heated such that the perforations are completely healed.

When reading, a light source (e.g. near field optical-tip) will be moved together with the cantilever. Read stimulus (light or appropriate signal to generate light emission out of the tip) 22 is fed into the probe transducer 8 via contact 21. If a return path is required, stimulus return signal 24 is fed back to the data sink via contact 23. The light penetrating the perforations is detected by a CCD-sensor area 31. Read signal 25 generated by the CCD sensor is fed back to the data sink 26 via connector 30. The position of the information bit 20 actually read is known from the position of the cantilever.

Figure 10:
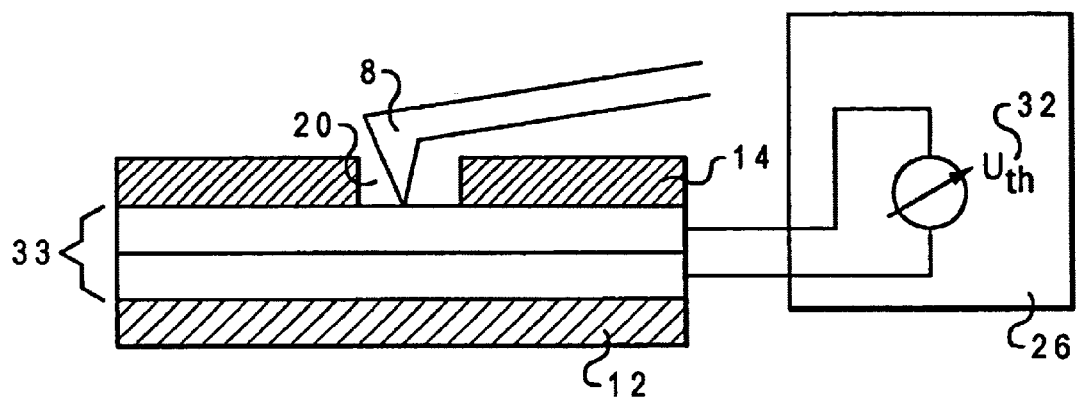
FIG. 10 illustrates another example of the method according to the invention, using thermovoltage effects.

An example using thermovoltage effects is shown in FIG. 10.

An thermal insulating recording layer is locally perforated by the writing current using methods already described. The storage medium is composed of several layers forming a thermoelement 33. On top of the medium recording layer 14 is located. Thermovoltage 32 is generated and fed to the data sink 26. When reading, the cantilever tip is in contact with the medium's surface. If an information bit 20 was written, the recording layer is perforated. When the tip gets in contact with the thermoelement, temperature of the medium will change due to the contact with the tip. A change in thermovoltage $U_{th}$ is generated and detected by the data sink.

Figure 11:
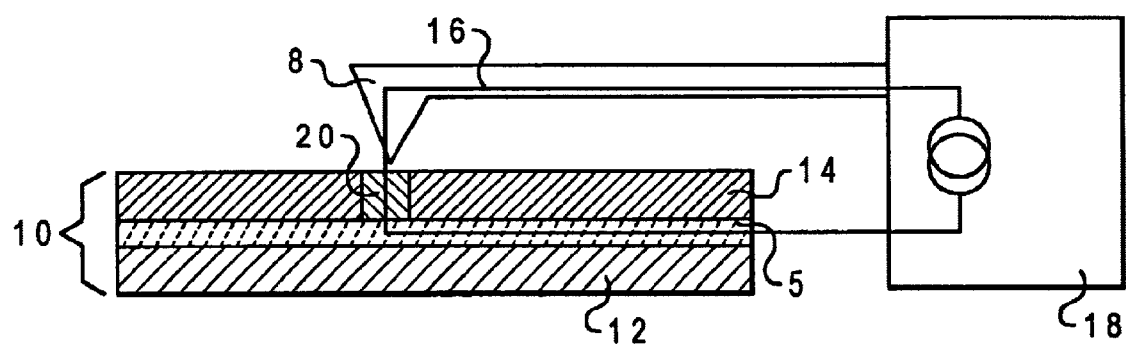
FIG. 11 depicts an example of the method according to the invention, using the effect of magnetic domain switching.

An example using magnetic domain effects is shown in FIG. 11.

The storage medium is composed of a magnetizable recording layer 14 on a high permeability underlayer 5. Additional layers as well as patterned media may be used. Patterned media promise more stable domains at smaller bit size. The probe transducer may be constructed as a magnetic flux guide or carry a flux generating write coil with highly permeable tip. The write signal 16 arising from the data source is either a magnetic flux feeding the flux guide or a write current feeding the write coil. In any case, magnetic flux arises from the tip, saturating the storage medium, thus forming an information bit 20. The write signal path closes via a soft magnetic underlayer 5 and data source 18. Readback may be done for instance by conventional MFM (magnetic force microscopy) methods.

What is claimed is:

1. A method for recording information on and reproducing information from a storage medium, said method comprising:
    forming said storage medium as part of a read signal path;
    positioning a probe transducer on said storage medium;
    generating a write signal within a data source;
    feeding said probe transducer with said write signal;
    changing physical characteristics of said storage medium by means of said write signal;
    forming said storage medium as part of a read signal path;
    generating a read stimulus being modified due to said changed physical characteristics;
    feeding a data sink with said modified read stimulus.

2. The method of claim 1, further comprising:
    recording and storing information on said storage medium; and
    locally changing characteristics of said storage medium in response to said recording and storing.

3. The method of claim 1, further comprising selecting said storage medium from a group consisting of:
    a layer of an electrical or thermal insulating material;
    a layer of high resistance material;
    a layer of optical absorbing material;
    a layer of optical reflecting material;
    a layer of magnetizable material; and
    a thermoelement structure;
    or combinations thereof.

4. The method of claim 3, further comprising forming said storage medium as a multilayer structure comprising at least one of said layers.

5. The method of claim 3, further comprising forming holes in said storage medium.

6. The method of claim 3, further comprising locally switching a resistance of said layer.

7. The method of claim 3, further comprising locally switching a reflectivity of said layer.

8. The method of claim 3, further comprising:
    forming said storage medium utilizing a magnetizable layer; and
    forming at least one magnetic domain in said storage medium, in response to said forming said storage medium utilizing a magnetic medium.

9. The method of claim 1, further comprising:
    reproducing information from said storage medium; and
    contacting said storage medium with a probe, in response to said reproducing.

10. The method of claim 1, further comprising:
    reproducing information from said storage medium; and
    orienting a probe in close proximity to said storage medium, in response to said reproducing.

11. The method of claim 1, further comprising:
    reproducing information from said storage medium; and
    intermittently contacting said storage medium with a probe, in response to said reproducing step, wherein a probe is in intermittent contact with said storage medium when information is reproduced.

12. The method of claim 1, further comprising utilizing said read stimulus to generate a new signal, such that said data sink is being fed with said read signal.

13. An apparatus for recording information on and reading information from a storage medium, said apparatus comprising:
    a non-conductive substrate;
    a storage medium;
    a data source generating a write signal;
    a probe tip or a probe array;
    a write/read signal path;
    positioning means for positioning said probe tip or probe array on said storage medium; and
    a data sink detecting a read signal, wherein said storage medium forms part of said write/read signal path.

14. The apparatus of claim 13, wherein a conductive layer is positioned on top of said non-conductive substrate.

15. The apparatus of claim 13, further comprising distance control means.

16. The apparatus of claim 13, wherein said probe tip or probe array is in direct contact with said storage medium.

17. The apparatus of claim 13, wherein said probe tip or probe array is arranged near said storage medium and not in direct contact therewith.

18. The apparatus of claim 13, wherein said probe tip or probe array is in intermittent contact with said storage medium.

19. The apparatus of claim 13, wherein said storage medium is selected from a group consisting of an electrical or thermal insulating material, a layer of high resistance material, a layer of optical absorbing material, a layer of optical reflecting material, a layer of magnetizable material, and a thermoelement structure; or combinations thereof.

* * * * *

UNITED STATES PATENT AND TRADEMARK OFFICE
CERTIFICATE OF CORRECTION

PATENT NO. : 6,665,258 B1
DATED : December 16, 2003
INVENTOR(S) : Dietzel et al.

It is certified that error appears in the above-identified patent and that said Letters Patent is hereby corrected as shown below:

<u>Column 9,</u>
Line 48,
"1.  A method for recording information on and reproducing information from a storage medium, said method comprising:
  forming said storage medium as part of a read signal path;
  positioning a probe transducer on said storage medium;
  generating a write signal within a data source;
  feeding said probe transducer with said write signal;
  changing physical characteristics of said storage medium by means of said write signal;
  forming said storage medium as part of a read signal path;
  generating a read stimulus being modified due to said changed physical characteristics;
  feeding a data sink with modified read stimulus." should instead read

UNITED STATES PATENT AND TRADEMARK OFFICE
CERTIFICATE OF CORRECTION

PATENT NO. : 6,665,258 B1
DATED : December 16, 2003
INVENTOR(S) : Dietzel et al.

It is certified that error appears in the above-identified patent and that said Letters Patent is hereby corrected as shown below:

<u>Column 9,</u>
Line 48, (cont.)
-- 1.     A method for recording information on and reproducing information from a storage medium, said method comprising:
        positioning a probe transducer on said storage medium;
        generating a write signal within a data source;
        feeding said probe transducer with said write signal;
        changing physical characteristics of said storage medium by means of said write signal;
        generating a read stimulus being modified due to said changed physical characteristics;
        feeding a data sink with said modified read stimulus;
        forming said storage medium as part of a write signal path;
        forming said storage medium as part of a read signal path. --

Signed and Sealed this

Twentieth Day of April, 2004

JON W. DUDAS
*Acting Director of the United States Patent and Trademark Office*